United States Patent
Riera et al.

(10) Patent No.: US 11,982,204 B2
(45) Date of Patent: May 14, 2024

(54) TURBOMACHINE PART OR ASSEMBLY OF PARTS

(71) Applicant: SAFRAN, Paris (FR)

(72) Inventors: William Henri Joseph Riera, Moissy-Cramayel (FR); Gabriel Jacques Victor Mondin, Moissy-Cramayel (FR)

(73) Assignee: SAFRAN, Paris (FR)

( * ) Notice: Subject to any disclaimer, the term of this patent is extended or adjusted under 35 U.S.C. 154(b) by 0 days.

(21) Appl. No.: 17/794,077

(22) PCT Filed: Jan. 19, 2021

(86) PCT No.: PCT/FR2021/050093
§ 371 (c)(1),
(2) Date: Jul. 20, 2022

(87) PCT Pub. No.: WO2021/148751
PCT Pub. Date: Jul. 29, 2021

(65) Prior Publication Data
US 2023/0138043 A1 May 4, 2023

(30) Foreign Application Priority Data
Jan. 23, 2020 (FR) ...................................... 2000668

(51) Int. Cl.
*F01D 5/14* (2006.01)
(52) U.S. Cl.
CPC .......... *F01D 5/141* (2013.01); *F05D 2220/30* (2013.01); *F05D 2240/30* (2013.01)

(58) Field of Classification Search
CPC .......... F01D 5/141; F01D 5/143; F01D 5/145; F01D 5/146; F01D 11/006; F01D 5/147;
(Continued)

(56) References Cited

U.S. PATENT DOCUMENTS

| | | | | |
|---|---|---|---|---|
| 8,303,258 | B2 * | 11/2012 | Aubin | F04D 29/681 |
| | | | | 416/193 A |
| 8,591,176 | B2 * | 11/2013 | Guemmer | F04D 29/681 |
| | | | | 415/914 |
| 9,657,575 | B2 * | 5/2017 | Okita | F01D 9/041 |

FOREIGN PATENT DOCUMENTS

| | | | |
|---|---|---|---|
| EP | 3 205 820 A1 | 8/2017 | |
| FR | 3 014 943 A1 | 6/2015 | |

(Continued)

OTHER PUBLICATIONS

International Search Report dated Apr. 23, 2021 in International Application No. PCT/FR2021/050093.

(Continued)

*Primary Examiner* — Eric J Zamora Alvarez
(74) *Attorney, Agent, or Firm* — Sughrue Mion, PLLC (57) ABSTRACT

A turbomachine part or assembly of parts includes a first blade and a second blade, and platform from which the first blade and the second blade extend, The platform has, between a pressure side of the first blade and a suction side of the second blade a non-axisymmetric surface defining at least one fin, and a transverse section of the fin is asymmetric. The transverse section includes a first and a second oblique faces joining at a dorsal edge, the first oblique face is oriented toward the pressure side of the first blade, the second oblique face is oriented toward the suction side of the second blade, and the first oblique face has a steeper slope than the second oblique face.

13 Claims, 11 Drawing Sheets

(58) Field of Classification Search
CPC .......... F01D 11/008; F01D 9/041; F01D 5/22; F01D 5/18; F01D 11/00; F01D 9/02; F01D 11/005; F04D 29/542; F04D 29/667; F04D 29/083; F04D 29/321; F04D 29/544; F04D 29/284; F05D 2240/30; F05D 2240/80; F05D 2250/11; F05D 2220/30; F05D 2250/711; F05D 2250/611; F05D 2250/73; F05D 2250/184; F05D 2250/71; Y02T 50/60
See application file for complete search history.

(56) References Cited

FOREIGN PATENT DOCUMENTS

| | | |
|---|---|---|
| JP | 2014-163367 A | 9/2014 |
| WO | 2015/092306 A1 | 6/2015 |

OTHER PUBLICATIONS

Written Opinion of the International Searching Authority dated Apr. 23, 2021 in International Application No. PCT/FR2021/050093.
French Search Report dated Jun. 18, 2020 in French Application No. 2000668.

* cited by examiner

TURBOMACHINE PART OR ASSEMBLY OF PARTS

CROSS REFERENCE TO RELATED APPLICATIONS

This application is a National Stage of International Application No. PCT/FR2021/050093 filed on Jan. 19, 2021, claiming priority based on French Patent Application No. 2000668 filed on Jan. 23, 2020, the contents of each of which being herein incorporated by reference in their entireties.

GENERAL TECHNICAL FIELD

The present invention relates to a turbomachine part comprising blades and a platform having a non-axisymmetric surface.

PRIOR ART

Figure 1:
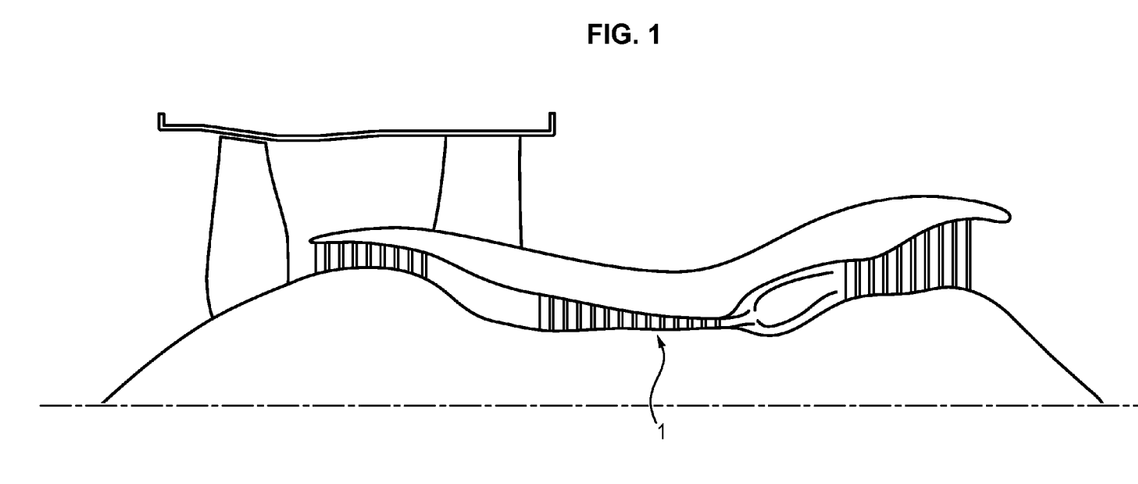
FIG. 1, previously described, shows an example of a turbomachine.

The necessity of constant improvement in the performance of equipment, in particular aeronautical equipment, for example turbomachine rotors or stators, of turbojets for example (i.e. the assembly formed from a hub to which blades are attached extending radially, as can be seen in in FIG. 1), has led at present to obtaining hubs having a locally non-axisymmetric surface (i.e. a section along a plane perpendicular to the axis of rotation is not circular) at the stream, i.e. all the fluid flow channels between the blades (in other words the inter-blade sections). More precisely, a surface of the hub is locally non-axisymmetric if the radius of the hub at the area varies depending on the angle that this radius forms with a vertical axis perpendicular to the axis of revolution of the hub. In contrast, a surface of the hub is locally asymmetric if the radius of the hub at the zone is constant regardless of the angle which this radius forms with a vertical axis perpendicular to the axis of revolution of the hub. The non-axisymmetric stream defines a surface that has an overall annular shape in a three-dimensional space (a "slice" of the hub).

Figure 2:
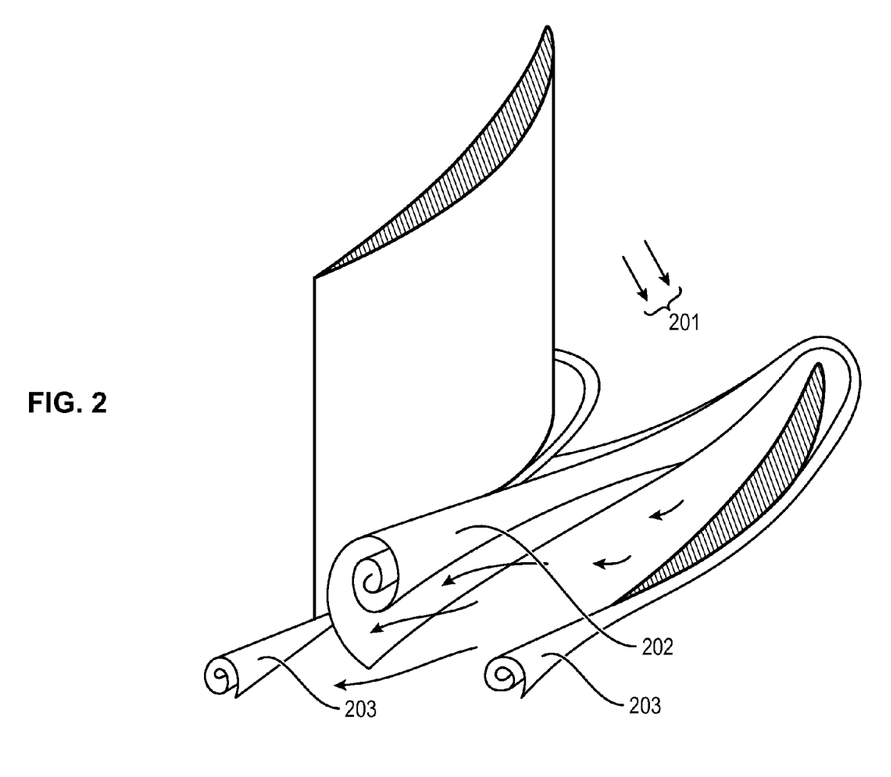
FIG. 2, previously described, shows a passage flow and a corner separation caused by a flow over a blade of a turbomachine.

FIG. 2 shows the effect of an entering flow 201 on the passage flow 202. This passage flow 202 is generated by the pressure gradient between the face under pressure (pressure side) and the face under suction (suction side) of a blade. This passage flow 202 impacts the suction side of the blade. In particular at the junction between the hub and the blading of a compressor a "corner separation" 203 ("corner flow") of the boundary layer occurs on the blade. This corner separation 203 generates pressure losses. The objective of the fins is then to reduce these corner separation effects 203 on the blade by acting direction on the passage flow 202.

The performance and the operability of compressors are reduced due to these undesired corner separations 203 on the blade. This effect increases as the "pitch" (ratio between the spacing between two blades "s" to the chord length "c" of the blades) increases.

In order to lighten future engines and to make them more compact, the number of blades of compressor stages is reduced, hence the spacing between two blades increases; in addition, the chord of the blades is reduced to make them more compact axially. The "pitch" therefore becomes greater, and the effects of passage become that much more problematical for these configurations.

Patent application WO2015092306A1 is known, in which fins are added on the hub or the casing of a turbomachine. These fins have a substantially triangular transverse section and allow the optimization of the performance of the turbomachine for a range of operation point of the latter. It would however be advantageous to obtain a broadening of the range of operating points for which performance is optimized. It would in particular be advantageous to improve the performance of the turbomachine when the angle of attack of the flow arriving on the blades is high, i.e. with an upstream flow which arrives with an angle of attack higher than that of the nominal case.

It would be desirable to have available a new type of fin allowing correcting these problems in order to improve performance in terms of the efficiency of the turbomachine, for a wide range of its operation.

GENERAL PRESENTATION OF THE INVENTION

Within this scope, the present invention resolves the technical problem of obtaining a turbomachine fin allowing improved performance of the turbomachine for a wide range of operation.

A turbomachine part or assembly of parts is thus proposed, according to a first aspect, comprising at least first and second blades, and a platform from which the blades extend.

The platform has, between the pressure side of the first blade and the suction side of the second blade, a non-axisymmetric surface defining at least one fin. The part is characterized in that a transverse section of the fin is asymmetric.

In one embodiment, the cross section of the fin comprises two oblique faces joining at a dorsal edge, a face oriented toward the pressure side of the first blade having a steeper slope than a face oriented toward the suction side of the second blade.

In one embodiment, a first tangent to the transverse section of the fin at an inflection point of the face oriented toward the pressure side of the first blade and a second tangent to the surface at the intersection of the first tangent and of the surface intersect while forming a first angle. A third tangent to the transverse section of the fin at an inflection point of the face oriented toward the suction side of the second blade and a fourth tangent to the surface at the intersection of the third tangent and of the surface intersect while forming a second angle. The first angle is smaller than the second angle.

In one embodiment the first angle is comprised between 90° and 130° and the second angle is less than 160°.

In one embodiment, a longitudinal section of the fin comprises a first portion in which a distance between the dorsal edge and the surface is increasing and a second portion in which the distance is decreasing. A tangent to the longitudinal section at a mid-height point of the first portion and the surface intersect while forming a fourth angle in particular comprised between 90° and 160. A tangent to the longitudinal section at a mid-height point of the second portion and the surface intersect while forming a fifth angle in particular comprised between 90° and 160.

In one embodiment the leading position of the fin is located at between −10% and 50% of the relative length of a chord of the blade extending from a leading edge to a trailing edge of the blade. The distance between the leading position of the fin and the suction side of the second blade is comprised between 5% and 95% of the distance between the pressure side of the first blade and the suction side of the second blade.

In one embodiment a tangent to a chord of the fin at the leading position of the fin and a tangent to the chord of the blade at a leading position of the blade intersect while forming a sixth angle comprised between −10° and +10°.

In one embodiment the fin has a length comprised between 5% and 120% of the length of the chord of the blade.

In one embodiment the fin has a width comprised between 1% and 40% of the distance between the pressure side of the first blade and the suction side of the second blade.

In one embodiment, the platform has an annular shape along which a plurality of blades is regularly arranged.

In one embodiment, the platform comprises the same non-axisymmetric surface between each pair of consecutive blades.

Another aspect relates to a compressor impeller or a straightener comprising the part or the assembly of parts previously described.

Another aspect relates to a turbomachine comprising a part or an assembly of parts previously described.

Another aspect relates to an aircraft comprising a turbomachine as previously described.

BRIEF DESCRIPTION OF THE DRAWINGS

Other features and advantages of the invention will still be revealed by the description that follows, which is purely illustrative and not limiting, and must be read with reference to the appended figures:

FIGS. 7-a and 7-b show the effect of the fins according to the invention on a passage vortex.

DESCRIPTION OF ONE OR MORE EMBODIMENTS

Figure 3:
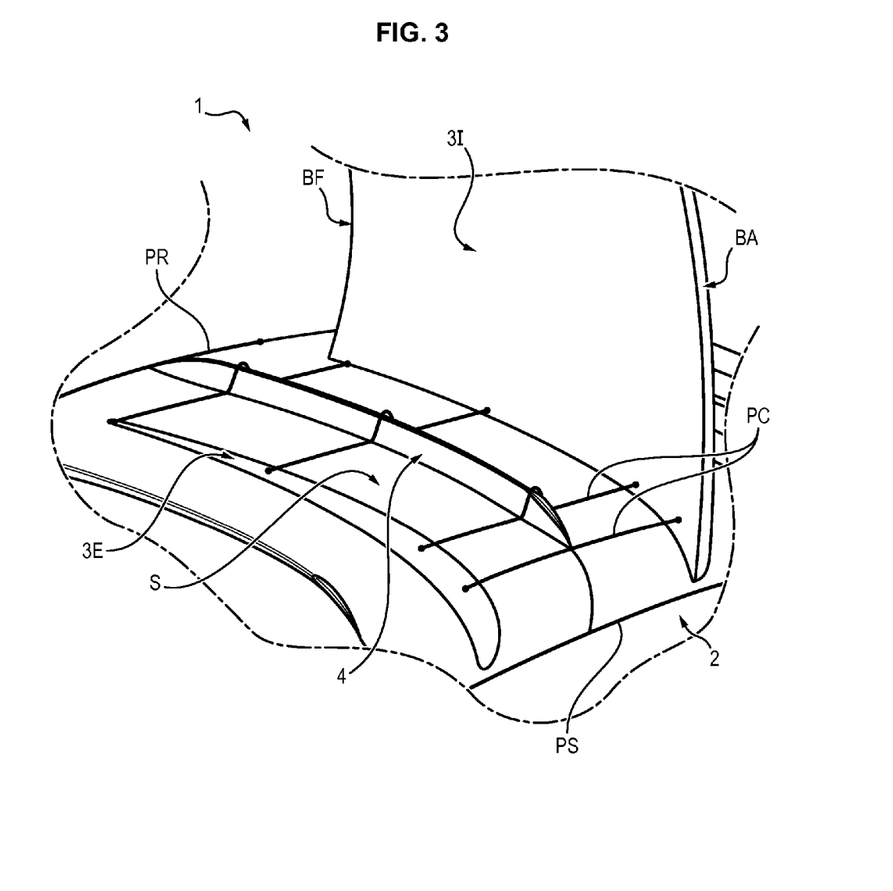
FIGS. 3 and 4 show two examples of fin configurations.

With reference to FIG. 3, the present turbomachine part 1 (OR assembly of parts if it is not a single piece) has at least two consecutive blades 3E, 3I and a platform 2 from which the blades 3E, 3I extend. Here the term platform is interpreted in the broad sense and generally designates any element of a turbomachine on which the blades 3E, 3I are likely to be mounted (while extending radially) and having an inner/outer wall against which air circulates.

In particular, the platform 2 can be a single piece (and thus support all the blades of the part 1), or formed from a plurality of elementary members each supporting a single blade 3E, 3I (a "root" of the blade) so as to constitute a blade of the type of that shown by FIG. 3. In particular, the platform 2 can comprise a portion of the platform for each of the blades 3E, 3I in an advantageous embodiment which will be described below. The platform 2 can delimit a radially inner wall of the part 1 (the gas passes around it) while defining a hub, and/or a radially outer wall of the part 1 (the gas passes inside it, the blades 3I, 3E extend toward the center) while then defining a casing of the part 1. It should be noted that the same part can simultaneously comprise these two types of platform 2.

It will be understood that, as explained, the part 1 can be of numerous types, particularly a rotor stage (DAM for "bisque Aubagé Monobloc [one-piece bladed disk]", or impeller, depending on whether the assembly is integral or not) or a stator stage (fixed straightener, or one having movable vanes VSV "Variable Stator Vane"), in particular at the inlet of the secondary flow which comprises fixed vanes serving to straighten the flow (OGV, or "Outlet Guide Vane" straightener), see FIG. 1 already introduced.

Hereafter in the present description, we will use for this purpose the example of an OGV stage, but a person skilled in the art will know how to transpose to other types of part 1 (for example to a fan or to a Low Pressure compressor stage.

Platform Surface

Figure 4:
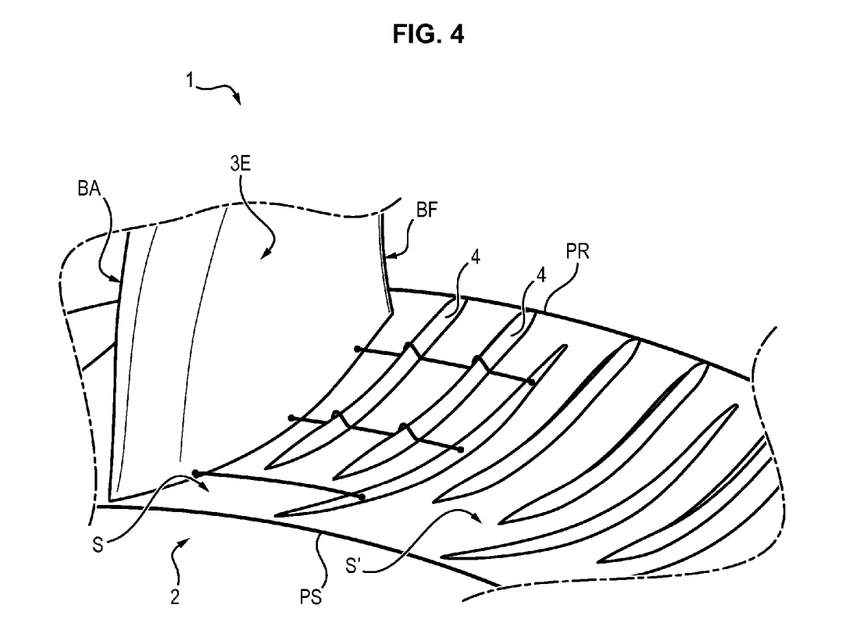

The present part 1 is distinguished by a particular (non-axisymmetric) geometry of a surface S of a platform 2 of the part 1, of which an advantageous example of modelling is observed in FIGS. 3 and 4. The surface S extends between two blades 3E, 3I (of which only one is visible in each of the FIGS. 3 and 5 to better observe the surface S. The outline of the missing blade is nevertheless observed in each case), which limit it laterally.

The surface S is in effect a portion of a greater surface defining a substantially toroidal shape around the part 1. Assuming (but without limitation) a periodicity in the circumference of the part 1 (i.e. if the blades 3E, 3I are identical and uniformly distributed), the wall consists of a plurality of identical surface duplicated between each couple of blades 3E, 3I.

The surface S' that can be seen in FIG. 4 is thus a duplication of the surface S.

In one embodiment, the platform 2 is composed of a plurality of elementary members, each being a root supporting a blade 3E, 3I with which it forms a blade. Each of these blade roots (called "platform portions" hereafter in the present description) thus extends on either side of the blade 3E, 3I, hence the fact that the surface S comprises juxtaposed surfaces associated with two distinct blade roots. The part 1 is then an assembly of at least two juxtaposed blades (blade/blade root assembly). These are called "integrated" platforms as opposed to "applied," i.e. independent of the blades, platforms (the surface S can then be constituted of a single element). It will be understood that the present invention is not limited to any particular structure of the platform 2.

The surface S is limited upstream by a first external plane, the "separation plane" PS and downstream by a second end plane, the "connection plane" PR which each define a contour that is axisymmetric, continuous and with a continuous derivative (the curve corresponding to the intersection between each of the planes PR and PS and the surface of the part 1 in its entirety is closed and forms a loop). The surface S has a substantially parallelogram shape and extends continuously between the two end planes PS, PR and the two blades 3E, 3I of a pair of consecutive blades. One of the blades of this pair of blades is the first blade 3I, or pressure side blade. It presents in fact its pressure side to the surface S.

The other blade is the second blade 3E, or suction side blade. It presents in fact its suction side to the surface S. Each "second blade" 3E is the "first blade" 3I of an adjacent surface such as the surface S' in FIG. 4 (because each blade 3E, 3I has a pressure side and a section side).

Profile of the Transverse Section of the Fin

Figure 5:
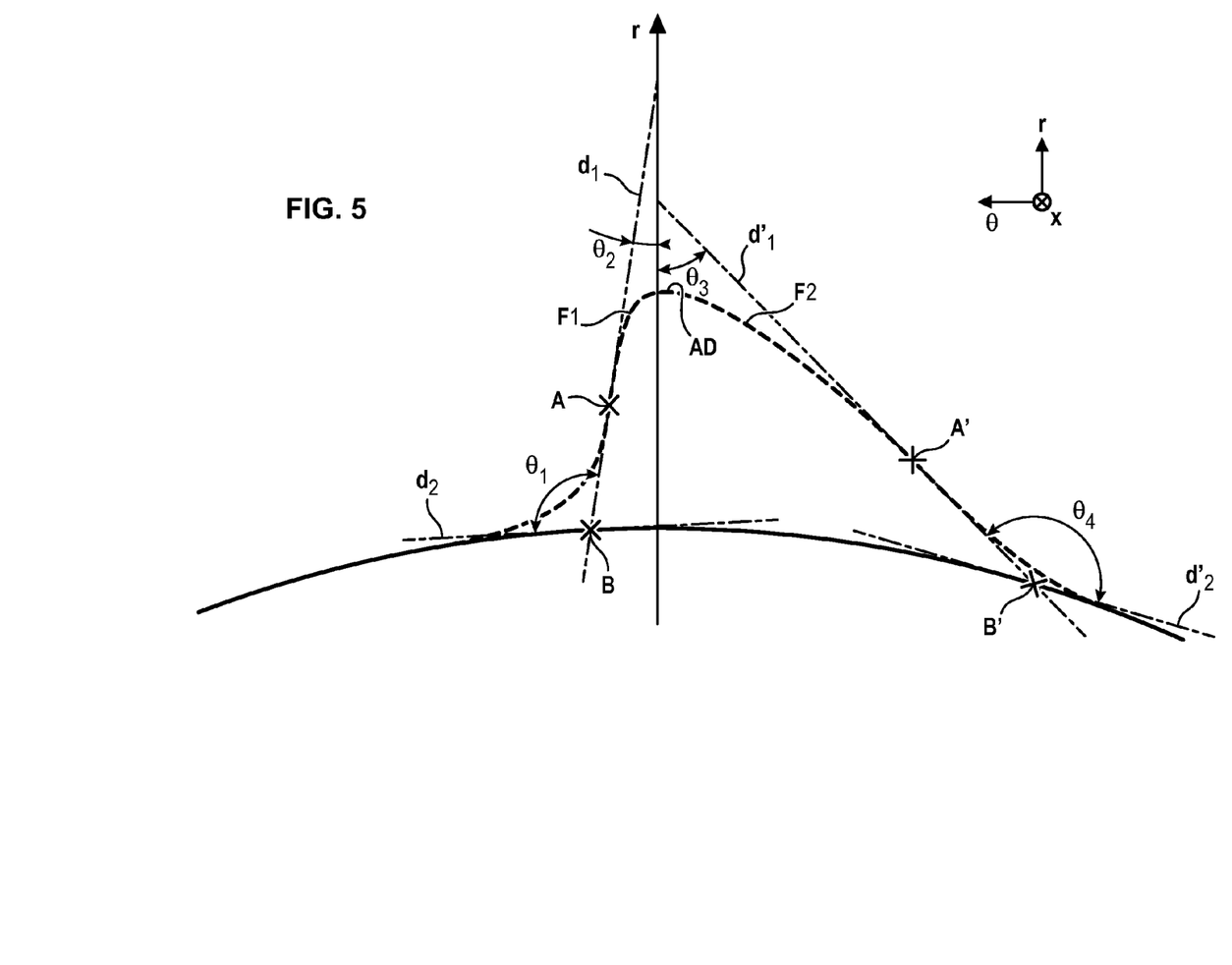
FIG. 5 shows a transverse section of the fin according to the invention.

The non-axisymmetric surface S of the present part is remarkable in that it defines at least one fin 4 which has an asymmetric transverse section (section taken along a transverse plane). What is meant by transverse plane is a particular plane at a tangent to a chord of the fin 4 at the point of the chord where the section is accomplished. The cross section of this fin is shown in FIG. 5.

What is meant by asymmetric transverse section is that the transverse section, as such, has no plane or axis of symmetry.

Advantageously, the fin 4 has the asymmetric cross section over at least 50% of a length of a chord of the fin. More particularly, it is possible that the fin does not have this asymmetric cross section in the area near its leading edge or in the area near its trailing edge.

This fin with an asymmetric cross section allows blocking the passage flow and reduces the generation of the fin wake. The cross section, and in particular its profile, of the fin advantageously has two oblique faces F1 and F2 joining at a dorsal edge AD, a face F1 oriented toward the pressure side of the first blade 3I having a steeper slope than a face F2 oriented toward the suction side of the second blade 3E.

These two oblique faces F1 and F2 join at the dorsal edge AD, either at an angle or with a tangent connection. The two faces themselves connect at the stream (rest of the surface S) either at an angle or with a tangent connection. The face therefore designates the entirety of the side of the fin extending between the dorsal edge AD and the connection point of the side or face with the surface S. The slope of a face is not necessarily constant and can vary between the connection point between the face and the surface and the dorsal edge AD.

A face A is steeper than a face B if the average slope, given by the ratio of the height of the dorsal edge AD to the distance between the projection of the dorsal edge AD on the hub and the point of the hub where the face connects to the surface S, is greater for the face A than for the face B.

This steep face F1 for the portion oriented toward the pressure side of the first blade 3I and this rounded face F2 for the portion oriented toward the suction side of the second blade 3E make the fin 4 more robust to changes of incidence and limits the losses when the flow of air passing between the blades is large.

Figure 6:
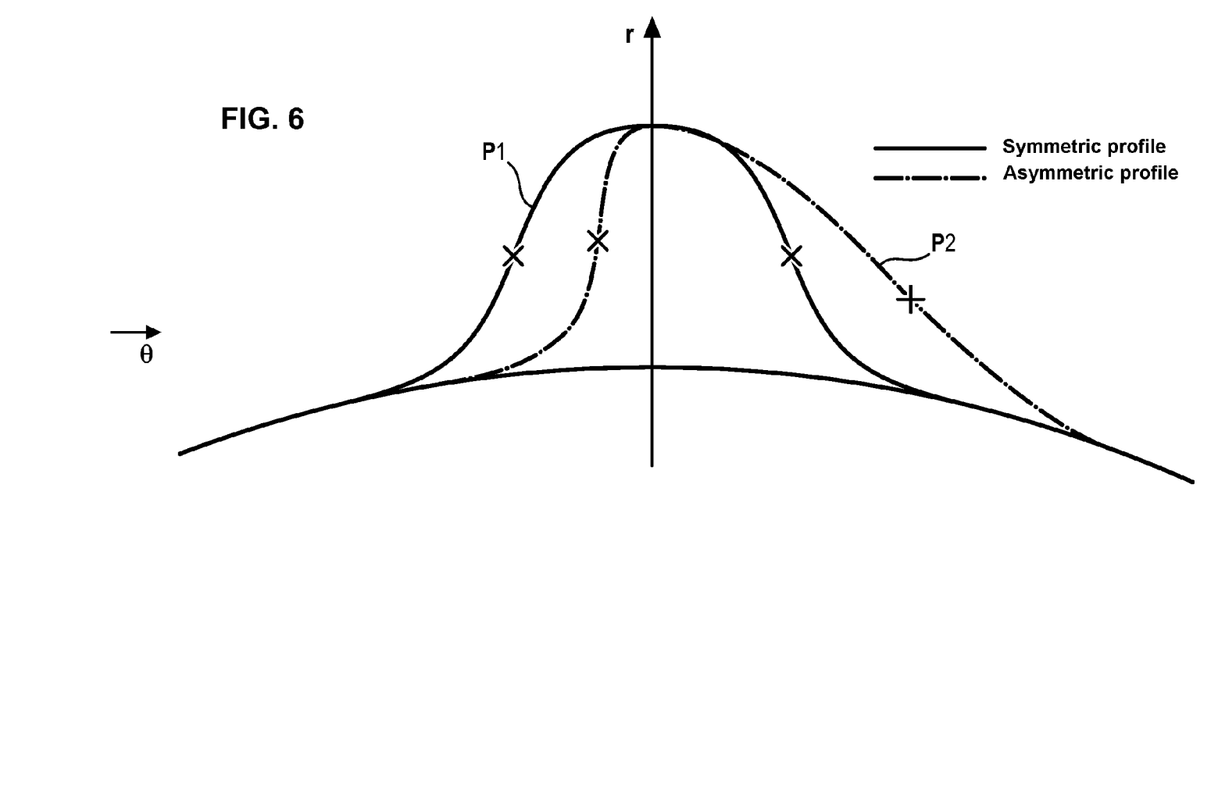
FIG. 6 shows a fin with a so-called symmetric profile and a fin with a so-called asymmetric profile.

FIG. 6 shows the difference between a fin having a symmetric profile P1 in broken lines and a fin having a non-symmetric profile P2 in continuous lines.

Figure 7A:
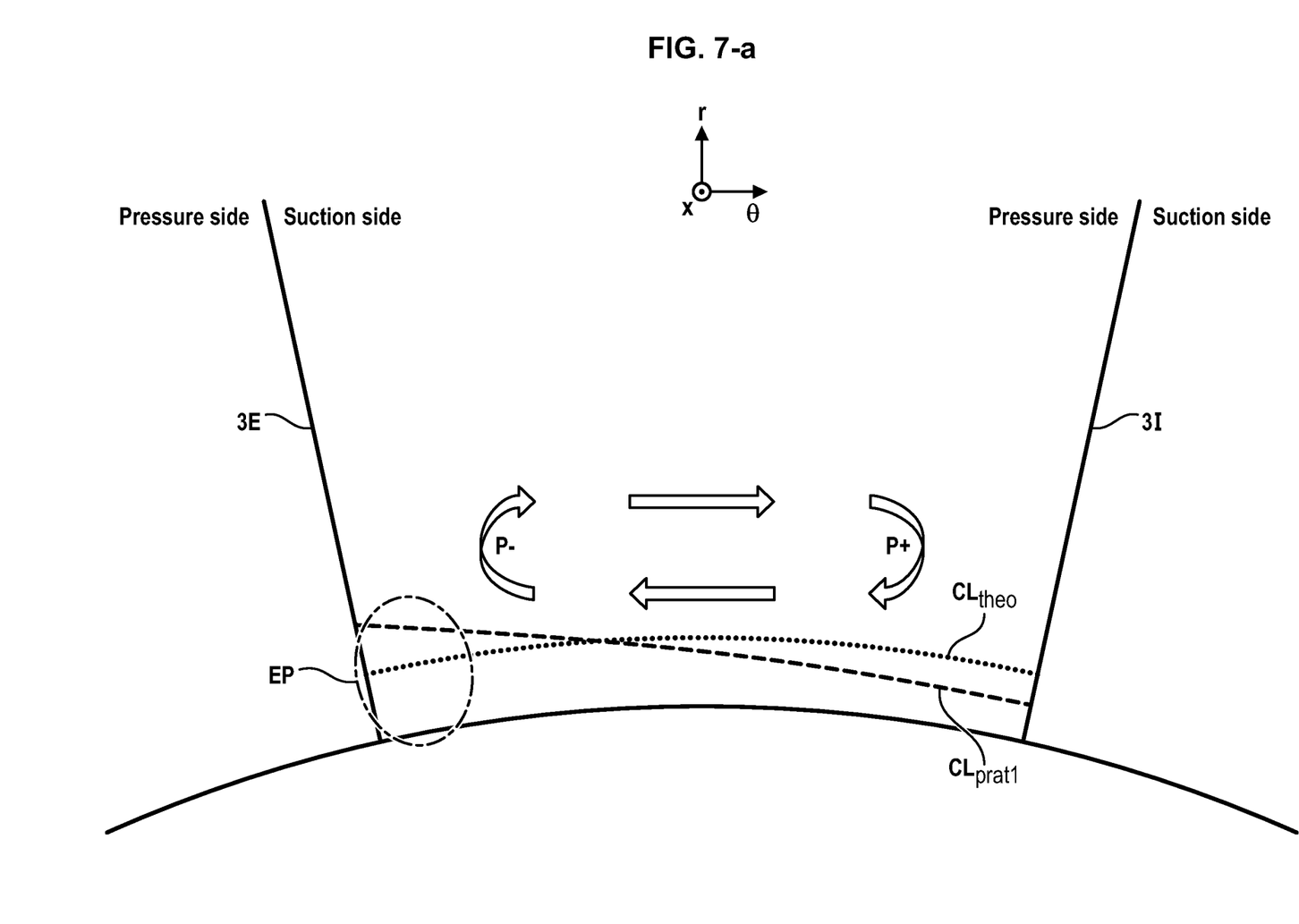

The effect of the passage flow on the corner boundary layer is shown in FIG. 7-a. The azimuthal pressure gradient creates a flow from the pressure side of the first blade 3I toward the suction side of the second blade 3E (passage vortex P+, P−). In doing so, it deforms the boundary layer of the hub, which has the effect of thinning it on the pressure side of the blade 3I and thickening it on the suction side of the blade 3E. In this figure, this thickening is shown in the circle EP. The theoretical boundary layer $CL_{theo}$ and the practical boundary layer with the effect of the passage vortex $CL_{prat1}$ are also shown. This results in an accumulation of fluid with a small quantity of movement, more sensitive to perturbations originating in the main flow and more likely to separate.

Figure 7B:
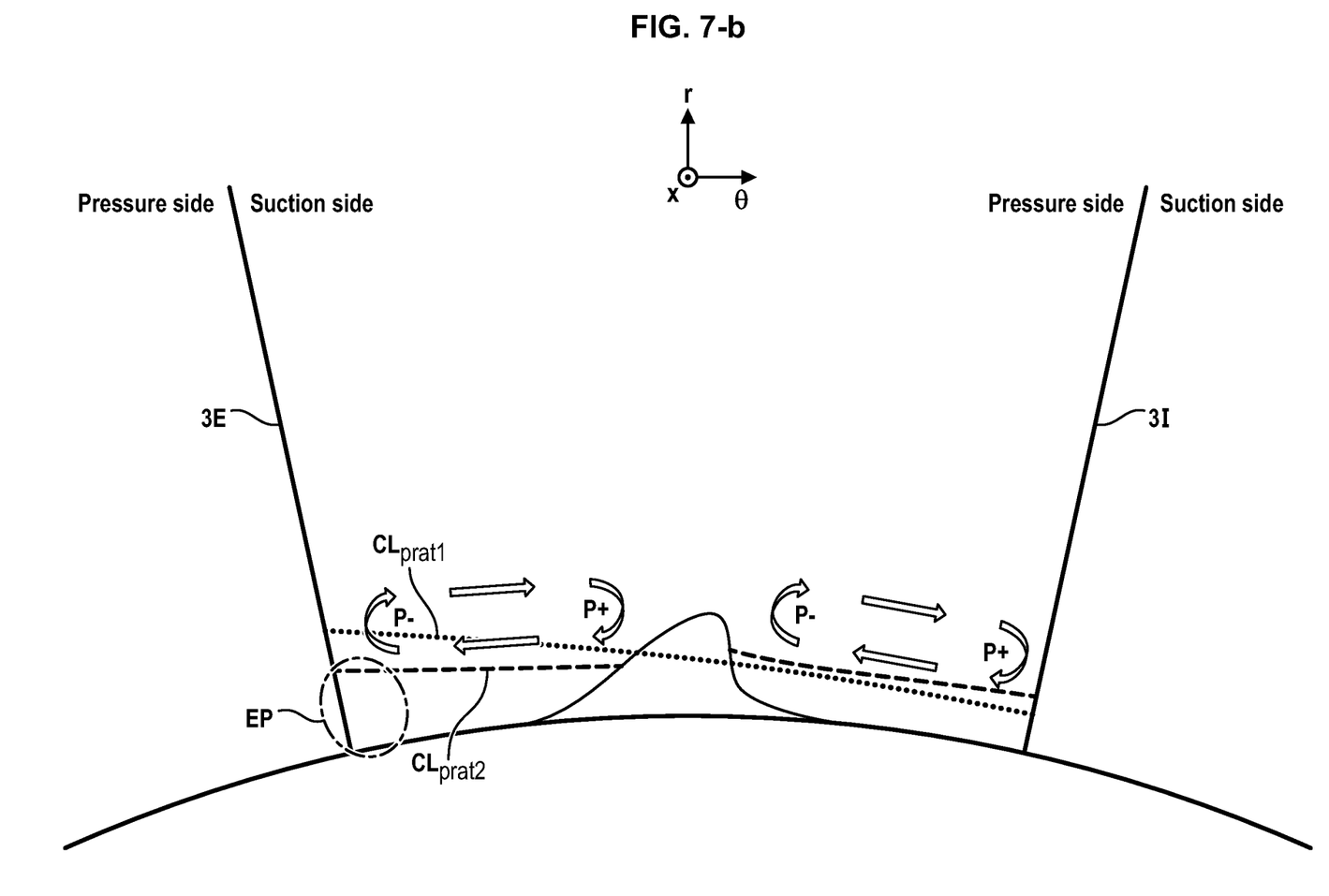

FIG. 7-b show the same phenomenon, this time with the addition of a fin between the blades 3I and 3E. New pressure gradients are established and passage vortices (P+, P−) have a smaller amplitude. This fin also offers the advantage of thinning the corner boundary layer of the blade 3E ($CL_{prat2}$) relative to the case where there is no fin ($CL_{prat1}$). This boundary layer is then more resistant to separation and generates fewer losses.

Thus the proposed fin allows the pressure side to suction side flow to be limited as much as possible in order to reduce the size of the corner boundary layer. The steep slope of the fin on the pressure side of the first blade 3I thus blocks this flow.

On the other side, the risks of separation of the boundary layer which passes above the fin must be limited. In fact, a steep slope on this side would increase the losses significantly and would cancel the benefits brought by the fin 4. Due to its shallow slope on the suction side of the second blade 3E, the fin 4 present on this part 1 (or assembly of parts) allows this compromise to be offered.

In FIG. 5, $d_1$ represents a first tangent to the profile of the fin at an inflection point A of the face oriented toward the pressure side of the first blade 3I. $d_2$ represents a second tangent to the surface S at an intersection point of the first tangent $d_1$ and of the surface S. $\Theta_1$ represents a first angle between the first tangent $d_1$ and the second tangent $d_2$. $d_1'$ represents a third tangent to the profile of the fin at an inflection point of the face oriented toward the suction side of the second blade 3E. $d_2'$ represents a fourth tangent to the surface at the intersection of the third tangent $d_1'$ and of the surface S. $\Theta_4$ represents a second angle between the third tangent $d_1'$ and the fourth tangent $d_2'$. The first angle $\Theta_1$ is smaller than the second angle $\Theta_4$. Advantageously, the first angle $\Theta_1$ is comprised between 90° and 130° and the second angle $\Theta_4$ is less than 160°.

An inflection point of the face is a point at which there is a reversal of the concavity of the face. The concavity of the face then passes from the "convex" type to the "concave" (or reverse) type. This inflection point is the point where the derivative of the profile of the face changes sign. In the case where the face is represented by an affine function, the tangents to the face at all points of this face are identical, thus in this case the inflection point is any one of the points of the face.

Dimensions and Position of the Fin

The axial position of the fin and its dimensions are defined so as to limit the pressure losses generated by the presence of the fin.

Figure 8:
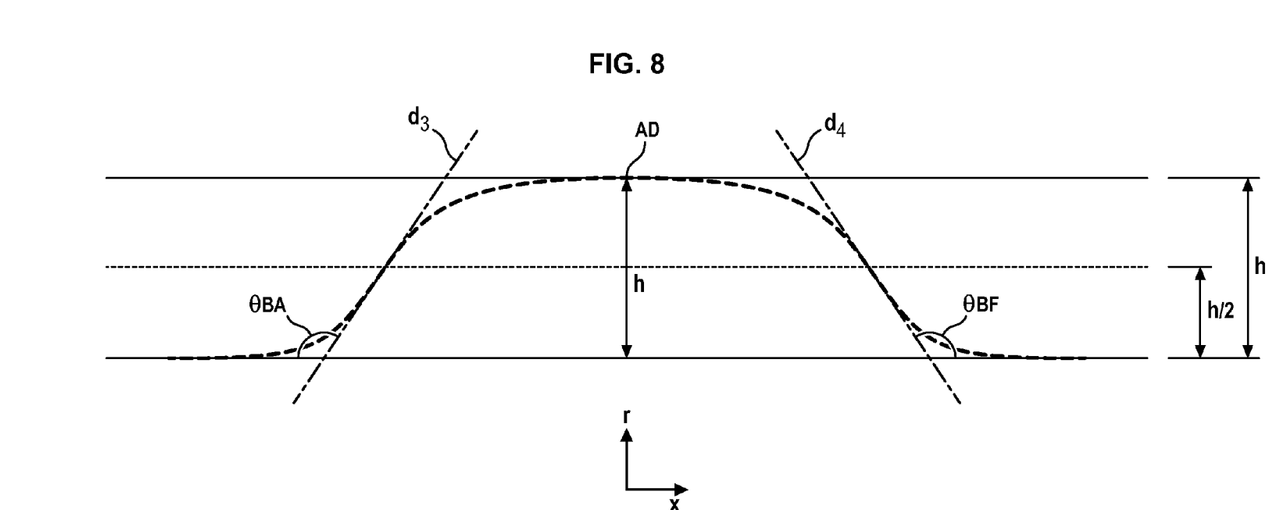
FIG. 8 shows, with a view in the azimuthal direction, the height of the fin according to the invention as a function of the axial direction.

Each fin 4 can also have bevelled ends as can be seen in FIGS. 2 and 3. FIG. 8 shows a longitudinal section of the fin 4; in this FIG. 8 the fin has two bevelled ends. This cross section is shown via a section passing through the dorsal edge AD of the fin and the axis of revolution of the stator or of the rotor supporting the fin and the blades. The height h of the dorsal edge AD of the fin 4 with respect to the surface S is therefore shown in this figure, as a function of the axial direction. This cross section has two portions; in the first portion a profile of the cross section is globally increasing and in the second portion the profile of the cross section is globally decreasing. For each portion, the mid-height point is defined as the point of the cross section at which the height of the fin 4 is equal to half the maximum height of the fin 4. There exist two mid-height points, associated respectively with the first portion and the second portion. $d_3$ represents a tangent to the cross section at the mid-height point of the first portion. This tangent $d_3$ crosses the surface S while forming a fourth angle denoted $\Theta_{BA}$. $d_4$ represents a tangent to the cross section at the mid-height point of the second portion. This tangent $d_4$ crosses the surface S while forming a fifth angle denoted $\Theta_{BF}$. Advantageously, the fourth angle and the fifth angle are comprised between 90° and 160.

The fin 4 has a width comprised between 1% and 40% of the distance between the pressure side of the first blade 3I and the suction side of the second blade 3E. The width considered here is the maximum width of the base of the fin 4 (which is substantially constant, other than at the leading and trailing bevels). This width and the distance between the pressure side of the first blade 3I and the suction side of the second blade 3E are preferably evaluated along planes parallel to the end planes PS, PR, which are visible in FIGS. 3 and 4.

The fin 4 has a length comprised between 5% and 120% of the length of the chord of the adjacent blade (3E or 3I). This length of the fin offers the advantage of minimizing the wake generated by the fin 4.

The chord of a blade is a line running from the leading edge to the trailing edge of the blade.

The localization of the fin 4 is defined in particular by its upstream end point, which is a leading position on the surface S, from which the fin 4 extends (in particular by following the mean camber surface of the blades 3I, 3E).

Figure 9:
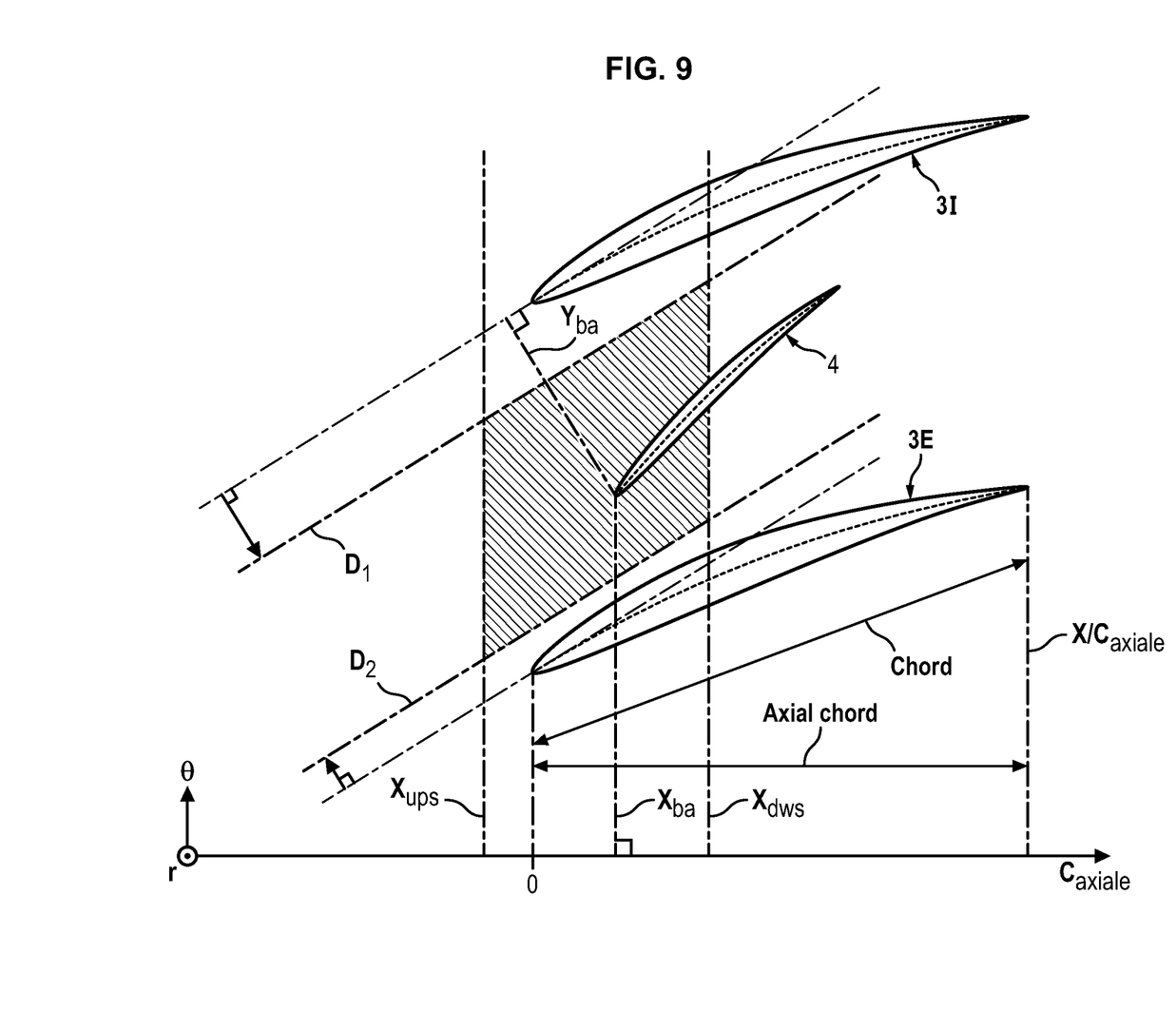
FIG. 9 shows the area in which the leading position of the fin according to the invention can be placed.

The leading position of the fin 4 is defined in the reference frame of FIG. 9 by coordinates $X_{BA}$ and $Y_{BA}$. These coordinates are respectively an axial coordinate and an azimuthal coordinate of the leading position of the fin.

The first coordinate $X_{BA}$ designates an (axial) position along a blade chord 3I, 3E extending from a leading edge BA to a trailing edge BF of the blade 3I, 3E, expressed in relative length (in other words, $X_{BA}=0$ corresponds to an alignment on the leading edges BA and $X_{BA}=1$ corresponds to an alignment with the trailing edges BF of the blades 3I, 3E). This therefore allows defining the end positions $X_{ups}$ and $X_{dws}$ of the leading position of the fin 4. Preferably, the axial leading position is located at between −10% and 50% of relative length of the chord of the blade 3I, 3E (i.e. XBA is included in [−0.1; 0.5]).

It is noted that the fin 4 is not necessarily comprised between the leading BA and trailing BF edges of the blades 3I, 3E and can extend axially downstream of the trailing edge BF or upstream of the leading edge BA.

The second coordinate YBA designates an (azimuthal) position along a channel width extending from the suction side of the second blade 3E to the pressure side of the first blade 3I, expressed in relative length (in other words, YBA=0 corresponds to a point against the suction side of the second blade 3E and YBA=1 corresponds to a point against the pressure side of the first blade 3I). This allows defining the distances D1 and D2 of the azimuthal leading position with respect to the chord of the first blade 3I and the chord of the second blade 3E. Preferably, the azimuthal leading position is located at a distance from the suction side of the second blade 3E, comprised between 5% and 95% of the channel width (i.e. YBA is included in [0.05; 0.95]).

Figure 10:
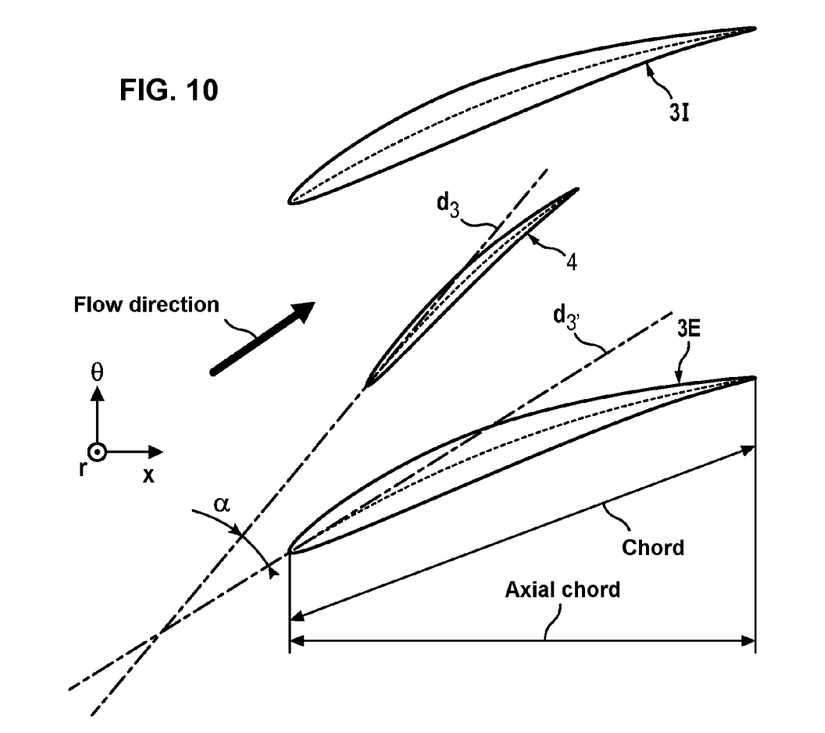
FIG. 10 shows the direction of the fin according to the invention with respect to the adjacent blades.

FIG. 10 represents a tangent $d_3$ to a chord of the fin 4 at the leading position of the fin and a tangent $d_3'$ to the chord of the blade at a leading position of the blade (3E or 3I).

Advantageously, the two tangents cross while forming a sixth angle comprised between −10° and +10°.

The different blades are generally arranged so that the tangents to the chord of the blades at the leading positions of the blades are parallel. Thus, the sixth angle a can be calculated based on the first blade 3I or the second blade 3E. Advantageously, the sixth angle a is calculated based on the blade closest to the fin in order to avoid incidence mismatches. By default, it is calculated based on the second blade 3E.

There may be one, two or three fins 4 on the stream. FIG. 3 show a solution with one fin 4, and FIG. 4 has two fins, but it will be understood that the invention is not limited to this case.

Preferably, each fin 4 has a trace (e.g. a trajectory) corresponding to the mean line of the mean camber surfaces of the first and second blades 3I, 3E. Usually, all the blades have the same mean camber surface, which is why all the fins 4 and blades 3I, 3E have a similar curvature, but it will be understood that the invention is not limited to this case.

The part 1 or part assembly if it is not one-piece can form a compressor impeller or straightener. Advantageously, the impeller is constituted by a part assembly, likewise a straightener ring. A compressor straightener is advantageously constituted of a single piece.

The invention claimed is:

1. A turbomachine part or assembly of parts comprising:
a first blade and a second blade; and
a platform from which the first blade and the second blade extend;
wherein the platform has, between a pressure side of the first blade and a suction side of the second blade, a non-axisymmetric surface defining at least one fin, and
wherein a transverse section of the fin is asymmetric, said transverse section comprises first and second oblique faces joining at a dorsal edge, the first oblique face is oriented toward the pressure side of the first blade, the second oblique face is oriented toward the suction side of the second blade, the first oblique face has a steeper slope than the second oblique face, a longitudinal section of the fin comprising:
a first portion wherein a distance between the dorsal edge and the surface is increasing and
a second portion wherein said distance is decreasing,
a tangent to the longitudinal section of the fin at a mid-height point of the first portion and the surface intersect while forming a fourth angle comprised between 90° and 160°; and
a tangent to the longitudinal section of the fin at a mid-height point of the second portion and the surface intersect while forming a fifth angle comprised between 90° and 160°.

2. The turbomachine part or assembly of parts according to claim 1, wherein the asymmetric transverse section of the fin runs over at least 50% of a length of a chord of the fin.

3. The turbomachine part or assembly of parts according to claim 1, wherein:
a first tangent to the transverse section of the fin at an inflection point of the first oblique face and
a second tangent to the surface at an intersection of the first tangent and of the surface, intersect while forming a first angle,
a third tangent to the transverse section of the fin at an inflection point of the second oblique face and
a fourth tangent to the surface at an intersection of the third tangent and of the surface, intersect while forming a second angle; and
the first angle is smaller than the second angle.

4. The turbomachine part or assembly of parts according to claim 3 wherein the first angle is comprised between 90° and 130° and the second angle is less than 160°.

5. The turbomachine part or assembly of parts according to claim 1 wherein:

a leading position of the fin is axially located at between −10% and 50% of a relative length of a blade chord of the first or the second blade, the blade chord extending from a leading edge at which the relative length is 0% to a trailing edge at which the relative length is 100% of one of the first and second blades; and a distance between the leading position of the fin and the suction side of the second blade is comprised between 5% and 95% of a distance between the pressure side of the first blade and the suction side of the second blade.

6. The turbomachine part or assembly of parts according to claim 1 wherein a tangent to a camber line of the fin at a leading position of the fin and a tangent to a camber line of one of the first and second blades at a leading position of the one of the first and second blades intersect while forming a sixth angle comprised between −10° and +10°.

7. The turbomachine part or assembly of parts according to claim 1 wherein the fin has a length comprised between 5% and 120% of a length of a chord of one of the first and second blades.

8. The turbomachine part or assembly of parts according to claim 1, wherein the fin has a width comprised between 1% and 40% of a distance between the pressure side of the first blade and the suction side of the second blade.

9. The turbomachine part or assembly of parts according to claim 1, wherein the platform has an annular shape along which are regularly disposed a plurality of blades.

10. The turbomachine part or assembly of parts according to claim 9, wherein the platform comprises the non-axisymmetric surface between each pair of consecutive blades in said plurality of blades.

11. The turbomachine part or assembly of parts according to claim 10, wherein the turbomachine part or assembly of parts is a compressor impeller or straightener.

12. A turbomachine comprising the turbomachine part or assembly of parts according to claim 1.

13. An aircraft comprising the turbomachine according to claim 12.

\* \* \* \* \*